US009584245B2

(12) United States Patent
Tsai et al.

(10) Patent No.: US 9,584,245 B2
(45) Date of Patent: Feb. 28, 2017

(54) NON-COHERENT NEIGHBOR CELL SEARCHING METHOD

(71) Applicant: National Central University, Taoyuan County (TW)

(72) Inventors: Pei-Yun Tsai, Taoyuan County (TW); Shun-Fang Liu, Taoyuan County (TW)

(73) Assignee: NATIONAL CENTRAL UNIVERSITY, Taoyuan County (TW)

( * ) Notice: Subject to any disclaimer, the term of this patent is extended or adjusted under 35 U.S.C. 154(b) by 150 days.

(21) Appl. No.: 14/226,196

(22) Filed: Mar. 26, 2014

(65) Prior Publication Data
US 2015/0280849 A1 Oct. 1, 2015

(51) Int. Cl.
*H04L 27/26* (2006.01)
*H04J 11/00* (2006.01)

(52) U.S. Cl.
CPC ......... *H04J 11/0076* (2013.01); *H04J 11/004* (2013.01); *H04J 11/0093* (2013.01);
(Continued)

(58) Field of Classification Search
CPC .............. H04J 11/0076; H04J 11/0069; H04L 27/2657; H04L 27/2668; H04L 27/2656; H04L 5/0048; H04W 48/16; H04W 24/10
(Continued)

(56) References Cited

U.S. PATENT DOCUMENTS

| 7,254,163 B2* | 8/2007 | Chen | H04B 1/70735 370/350 |
| 2006/0078040 A1* | 4/2006 | Sung | H04L 27/2613 375/140 |

(Continued)

OTHER PUBLICATIONS

P. Y. Tsai and H. W. Chang, "A new cell search scheme in 3GPP long term evolution downlink OFDMA systems," in Proc. 2009 IEEE Conf. on Wireless Communications and Signal Processing, pp. 1-5, Nov. 13-15, 2009.
(Continued)

*Primary Examiner* — Jamal Javaid
(74) *Attorney, Agent, or Firm* — WPAT, PC; Justin King

(57) ABSTRACT

The present invention relates to a non-coherent neighbor cell search method for primary synchronization signal (PSS) and secondary synchronization signal (SSS). In order to eliminate the channel response of the home cell, the present invention utilizes the similarity of channel responses at adjacent subcarriers, components at the $k^{th}$ subcarrier and the $(k+1)^{th}$ subcarrier of the received signal are respectively multiplied by the conjugation of the corresponding local synchronization signal to respectively obtain the $k^{th}$ product and the $(k+1)^{th}$ product. Afterward, a combination signal is obtained by examining the difference of the $k^{th}$ product and the $(k+1)^{th}$ product. By mathematical simplification and analysis, the main unknown component of the combination signal is the synchronization signal of neighbor cell, also in a compound form. Thus, the neighbor cell ID can be obtained by performing the correlation operation of the combination signal to the compound reference sequence.

20 Claims, 9 Drawing Sheets

(52) U.S. Cl.
CPC ...... *H04L 27/2657* (2013.01); *H04L 27/2668* (2013.01); *H04L 27/2672* (2013.01); *H04L 27/2692* (2013.01)

(58) Field of Classification Search
USPC ................................. 370/328, 329, 252, 350
See application file for complete search history.

(56) References Cited

U.S. PATENT DOCUMENTS

| | | | |
|---|---|---|---|
| 2009/0232125 A1 | 9/2009 | Kim et al. | |
| 2012/0122453 A1* | 5/2012 | Shin ...................... | H04L 25/022 455/434 |
| 2013/0176991 A1* | 7/2013 | Yi ........................ | H04J 11/0076 370/336 |

OTHER PUBLICATIONS

L. C. Wung, Y. C. Lin, Y. J. Fan, and S. L. Su, "A robust scheme in downlink synchronization and initial cell search for 3GPP LTE system," in Proc. 2011 International Wireless and Pervasive Computing, pp. 1-6, Feb. 23-25, 2011.

Shun-Fang Liu et al. "A Non-Coherent Neighbor Cell Search Scheme for LTE/LTE-A Systems", IEEE WCNC, Apr. 9, 2013.

* cited by examiner

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | — | — | — |
| 33 | 3 | 5 | 67 | 8 | 11 | 101 | 14 | 18 | 135 | 21 | 26 | — | — | — |

FIG. 5

NON-COHERENT NEIGHBOR CELL SEARCHING METHOD

BACKGROUND OF THE INVENTION

Field of Invention

The present invention relates in general to a method for decoding cell ID, and more particularly to a non-coherent method for decoding neighbor cell ID.

Related Art

In conventional mobile cellular system, in order to synchronize the time and frequency between a user equipment (UE) and a base station (eNB), an initial cell search is performed as soon as the UE starts up. In addition, the UE also needs to perform a cell search procedure to obtain a cell ID of the eNB, and then the access between the eNB and the UE can be performed. Taking the Third Generation Partnership Project Long Term Evolution (3GPP LTE) for example, in every cell, two types of synchronization signals will be broadcast for the UE to perform the cell search procedure. One type is the primary synchronization signal (PSS), the other is the secondary synchronization signal (SSS). In the downlink system, the UE performs time and frequency synchronization through PSS and SSS, and uses the two types of synchronization signals to obtain cell identities (Cell IDs).

There are 504 types of cell IDs in the LTE system, including group IDs and sector IDs, used to define cell IDs. The expression for cell ID reads as follows: $N_{ID}^{cell}=3N_{ID}^{(1)}+N_{ID}^{(2)}$. $N_{ID}^{(1)}$ represents a group ID, $N_{ID}^{(1)} \in \{0, 1, \ldots, 167\}$; $N_{ID}^{(2)}$ represents a sector ID, $N_{ID}^{(2)} \in \{0, 1, 2\}$. The above PSS is a Zadoff-Chu sequence, carrying the information of the sector ID $N_{ID}^{(2)}$. The above SSS consists of two maximum length sequences (ML-sequences), and the two ML-sequences are produced by two cyclic shifts ($m_0$, $m_1$) carrying the group ID $N_{ID}^{(1)}$. The mapping of group ID, ranging from 0 to 167, to a set of cyclic shifts ($m_0$, $m_1$) is one-to-one.

Further, for those mobile UEs to sustain connected to the network, they not only have to search the serving cell in their present location, but periodic neighbor cell search is also required to perform fast and efficient handover for the UEs in motion. However, the synchronization signal from the neighbor cell is generally very weak and seriously interfered by signals from the home cell. As a result, searching for neighbor cell ID becomes very difficult for the UE.

Conventional coherent detection uses the PSS to perform channel estimation and removes the signal component of the serving cell from the received signal, and then, the detection of the group ID and sector ID of the neighbor cell begins. However, the received PSS includes interferences, so the channel estimation is inaccurate and greatly fluctuates, and that causes the reduction of the detection accuracy of the neighbor cell ID. Therefore, before neighbor cell detection, the receiver often uses a channel smoothing filter to further process the detected channel responses, thus increasing the amount of computation in the receiver.

SUMMARY OF THE INVENTION

It is therefore an objective of the present invention to provide a non-coherent neighbor cell search method to decode the serving cell ID of the present location and the neighbor cell ID to facilitate efficient handover for UE in motion.

To achieve the above-identified or other objectives, the present invention provides a non-coherent neighbor cell search method, adapted for a user equipment (UE), wherein the UE communicates through a home cell. The non-coherent neighbor cell search method comprises the following steps. A home cell ID is decoded. Components at the $k^{th}$ subcarrier and the $(k+1)^{th}$ subcarrier of the received signal is obtained. A first product is obtained by multiplying the component at the $(k+1)^{th}$ subcarrier of the received signal by a conjugation of the component at the $(k+1)^{th}$ subcarrier of a local synchronization signal, wherein the local synchronization signal is a synchronization signal that corresponds with the home cell ID. A second product is obtained by multiplying the component at the $k^{th}$ subcarrier of the received signal by the conjugation of the component at the $k^{th}$ subcarrier of the local synchronization signal. A difference between the first product and the second product is calculated to obtain a combination signal. And, a correlation operation between the combination signal and all possible sequences corresponding to all possible IDs of the neighbor cell is performed so as to obtain a neighbor cell ID, wherein k is an integer.

The non-coherent neighbor cell search method according to the preferred embodiment of the present invention, the step of performing the correlation operation between the combination signal and all possible sequences corresponding to all possible IDs of the neighbor cell so as to obtain the neighbor cell ID comprises the following steps. A reference sequence function Y according to an operation of the combination signal is provided. M possible IDs are substituted in the reference sequence function Y, wherein an $x^{th}$ ID is substituted in the reference sequence function Y to obtain Y(x). The correlation operation is performed to obtain M correlation values, wherein the correlation operation between Y(x) corresponding to the $x^{th}$ possible ID and the combination signal is performed to obtain an $x^{th}$ correlation value. A maximum among the correlation values is searched. An ID is detected, that the ID corresponds with the maximum correlation value, to serve as the neighbor cell ID, wherein x and M are both positive integers.

The spirit of the present invention is to provide an algorithm of a combination signal for removal the home cell synchronization signal in order to preserve neighbor cell synchronization signal and thereby reducing errors while detecting the neighbor cell ID.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a schematic drawing showing how cyclic shifts correspond with group IDs according to a preferred embodiment of the present invention.

DETAILED DESCRIPTION OF THE INVENTION

The present invention will be apparent from the following detailed description, which proceeds with reference to the accompanying drawings, wherein the same references relate to the same elements.

The present invention will be fully understood from the detailed description given hereinafter and the accompanying drawings are given by way of illustration only, and thus are not limitative of the present invention. However, for convenient explanation of the embodiments of the present invention, the communication systems mentioned below all take the 3GPP LTE mobile communication system for example.

During the uplink and downlink transmission in the 3GPP LTE, signals are organized into radio frames. Two different radio frame structures support FDD mode and TDD mode respectively. All radio frame structures are 10 milliseconds and divided into 10 sub-frames. Every sub-frame is further divided into two 0.5 millisecond time slots. Every radio frame consists of 20 time slots; every time slot consists of 7 or 6 orthogonal frequency-division multiplexing (OFDM) symbols according to either normal cyclic-prefix (CP) mode or extended CP mode.

Figure 1A:
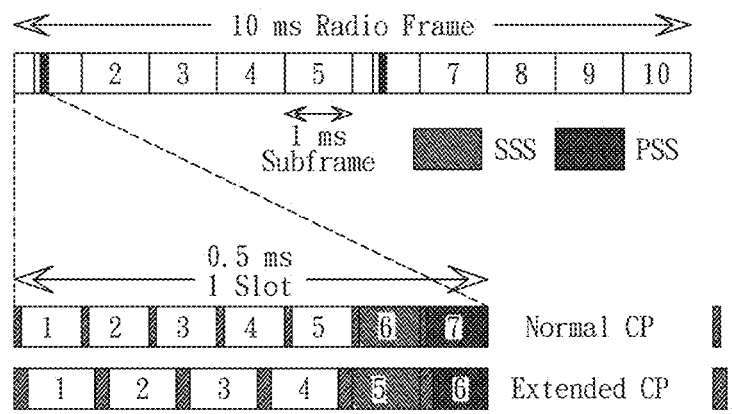
FIG. 1A is a schematic drawing of PSS and SSS signal structures in frequency-division duplex (FDD) mode according to a preferred embodiment of the present invention.
Figure 1B:
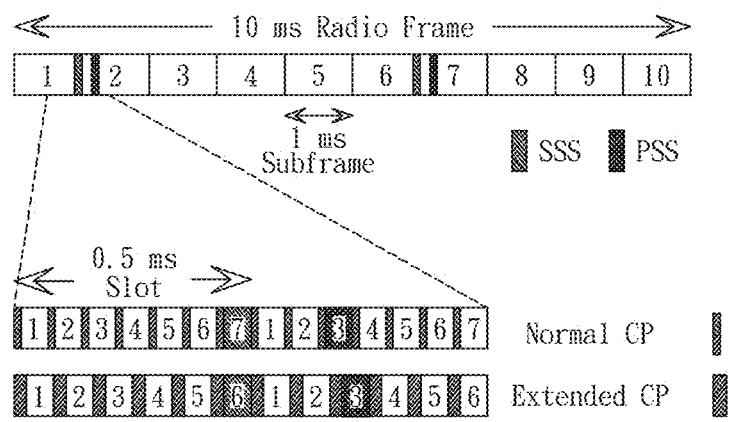
FIG. 1B is a schematic drawing of PSS and SSS signal structures in time-division duplex (TDD) mode according to a preferred embodiment of the present invention.

In order to perform an initial cell search and obtain necessary information for synchronization, two types of synchronization signals are inserted in the above radio frames, i.e. PSS and SSS. FIG. 1A depicts the PSS and SSS structures in time domain for FDD mode, while FIG. 1B depicts the PSS and SSS structures for TDD mode.

In the 3GPP LTE system, synchronization signals are transmitted periodically, twice per 10-ms radio frame. Referring to FIG. 1A, in FDD mode, PSS is transmitted in the last symbol of the first and the $11^{th}$ time slots of each radio frame, and the SSS is located in the symbol immediately preceding the PSS. Referring to FIG. 1B, in TDD mode, PSS is transmitted in the third symbol of the $3^{rd}$ and the $13^{th}$ time slots, and SSS is located in three symbols earlier than PSS.

Figures 2, 3:
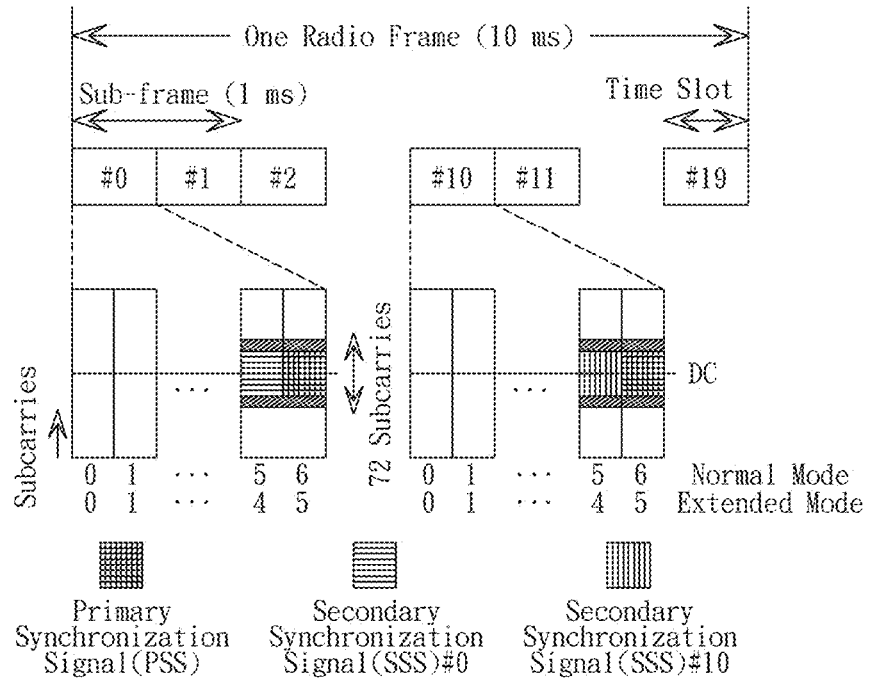
FIG. 2 is a schematic drawing showing the allocation of the frequency domain and the time domain in FDD mode according to a preferred embodiment of the present invention.
FIG. 3 is a schematic drawing showing the correspondence between sector IDs and root indexes according to a preferred embodiment of the present invention.

The 3GPP LTE downlink system supports different transmission bandwidths from 1.4 MHz to 20 MHz, and 5 Fast Fourier Transform (FFT) size types vary from 128 to 2048. For all transmission allocations, the synchronization channels for transmitting synchronization signals are arranged in the middle, 1.25 MHz (DC subcarrier). All synchronization channels take up 72 subcarriers, and only 62 subcarriers in the middle are used for transmitting PSS and SSS, and 5 subcarriers are reserved as empty subcarriers. The signal allocations in frequency domain and time domain in FDD mode are shown in FIG. 2. The horizontal axis represents time; the vertical axis represents frequency.

In the 3GPP-LTE system, the cell ID is expressed as $N_{ID}^{Cell}=3N_{ID}^{(1)}+N_{ID}^{(2)}$, wherein $N_{ID}^{(1)}$ represents group ID and $N_{ID}^{(1)} \in \{0, 1, \ldots, 167\}$; $N_{ID}^{(2)}$ represents sector ID and $N_{ID}^{(2)} \in \{0, 1, 2\}$. The above broadcast PSS carries the information of sector ID $N_{ID}^{(2)}$ and SSS carries the information of group ID $N_{ID}^{(1)}$.

Frequency domain signals of PSS are generated from the Zadoff-Chu sequence. The sequence has an ideal periodic autocorrelation properties: when two Zadoff-Chu sequences are aligned, the periodic autocorrelation has an obvious peak value; when two Zadoff-Chu sequences are mis-aligned, the periodic autocorrelation is zero. And, the cross-correlation of Zadoff-Chu sequences also is read zero within a certain range. Hence, the detecting efficacy by the Zadoff-Chu sequence is enhanced.

The primary synchronization signal PSS is expressed in the following equation (1). It generates 63 signals in total and the result allocated in the center subcarrier is zero.

$$d_u(k) = \begin{cases} e^{-j\frac{\pi uk(k+1)}{63}} & k = 0, 1, \ldots, 30 \\ 0 & k = 31 \\ e^{-j\frac{\pi uk(k+1)}{63}} & k = 32, 33, \ldots, 62 \end{cases} \quad (1)$$

u is the root index of the Zadoff-Chu sequence; its value is determined by the sector ID $N_{ID}^{(2)}$. The correspondence between the root index and the sector ID is shown in FIG. 3. It is clear from the table of FIG. 3 that different sector IDs $N_{ID}^{(2)}$ generate different root indexes so as to select one Zadoff-Chu sequence as the information within PSS.

Figure 4:
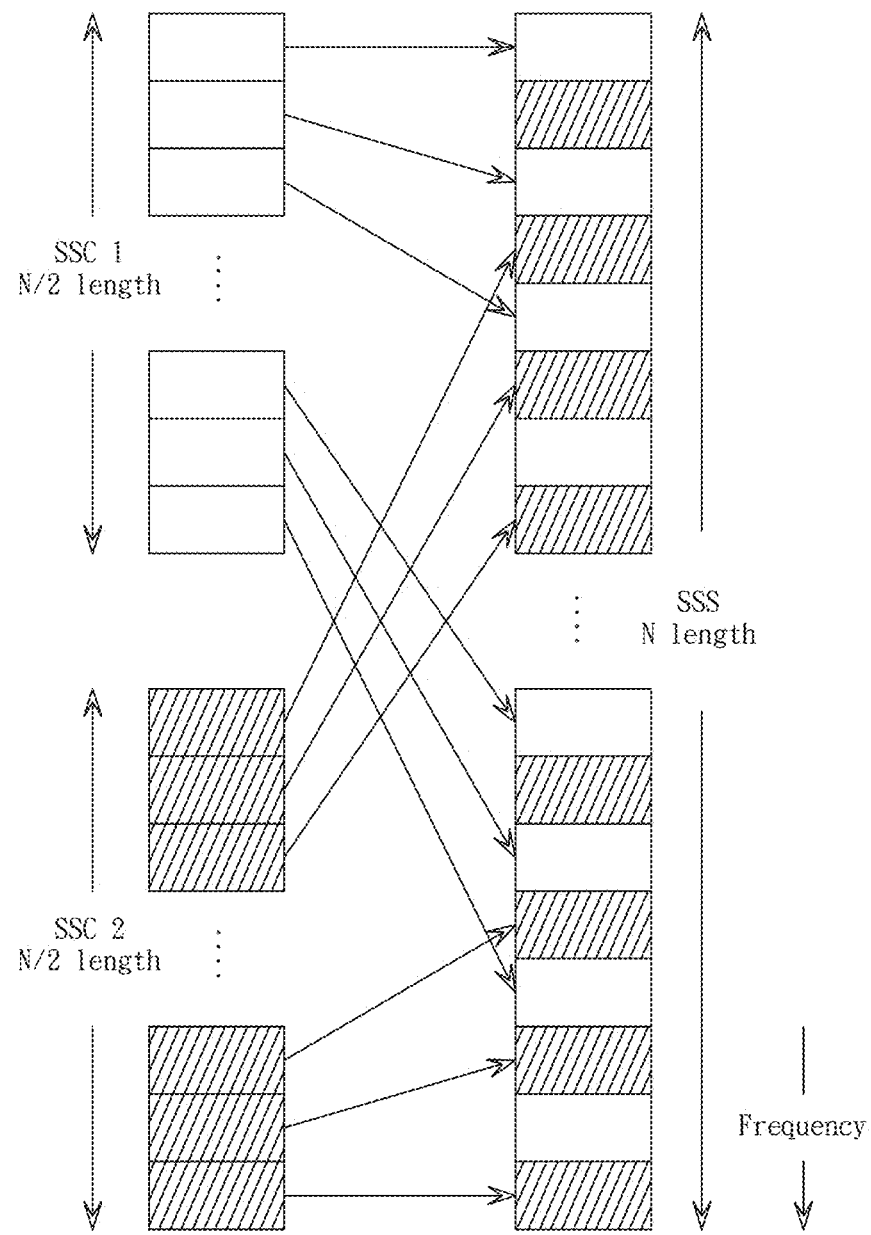
FIG. 4 is a schematic drawing showing the mapping between the sequences ($D_{i,2n}(m_0, m_1)$, $D_{i,2n+1}(m_0, m_1)$) and SSS in frequency-domain according to a preferred embodiment of the present invention.

The secondary synchronization signal (SSS), whose length is 62, is a sequence generated by two ML-sequences ($s_{m_j}(n)$ and $Z_{m_j}(n)$, $j=\{0,1\}$) and a scrambling sequence $c_j(n)$. The SSS is expressed in the following equations:

$$D_{i,2n}(m_0, m_1) = \begin{cases} s_{m_0}(n)c_0(n) & i = 0 \text{ or } 1 \\ s_{m_1}(n)c_0(n) & i = 10 \text{ or } 11 \end{cases} ; \quad (2)$$

$$D_{i,2n+1}(m_0, m_1) = \begin{cases} s_{m_1}(n)c_1(n)z_{m_0}(n) & i = 0 \text{ or } 1 \\ s_{m_0}(n)c_1(n)z_{m_1}(n) & i = 10 \text{ or } 11 \end{cases} . \quad (3)$$

n=0, 1, . . . , 30. SSS is composed by interlacing. The sequences $D_{i,2n}(m_0, m_1)$ and $D_{i,2n+1}(m_0, m_1)$ generated by equations (2) and (3) are modulated by Binary Phase Shift Keying (BPSK) and placed in even-numbered and odd-numbered subcarriers, as shown in FIG. 4. FIG. 4 is a schematic drawing showing the mapping between the sequences ($D_{i,2n}(m_0, m_1)$, $D_{i,2n+1}(m_0, m_1)$) and SSS in frequency-domain according to a preferred embodiment of the present invention. In addition, in equations (2) and (3), i is the slot index; when in TDD mode, i=1, 11; when in FDD mode, i=0, 10.

In the above equations (2) and (3), $s_{m_j}(n)$ and $z_{m_j}(n)$ are the ML-sequences whose cyclic shifts are generated by the indication $m_j$. The cyclic shift ($m_0, m_1$) of the ML-sequences is derived from a function of group ID $N_{ID}^{(1)}$ as shown in FIG. 5, wherein, the cyclic Shift ($m_0, m_1$) corresponds to group ID $N_{ID}^{(1)}$ one by one. Such one-on-one correspondence also exists between ML sequence $s_{m_j}(n)$ and $m_j$ as well as ML sequence $z_{m_j}(n)$ and $m_j$. On the other hand, the scrambing sequence $c_j(n)$ is determined by sector ID $N_{ID}^{(2)}$.

It is clear from the above description of PSS and SSS that when the UE performs cell search, sector ID $N_{ID}^{(2)}$ needs to be decoded from the PSS in the received signal. Afterwards, once the receiver detects which cyclic shift $m_j$ constitutes the ML sequences $s_{m_j}(n)$ and $z_{m_j}(n)$ in SSS, group ID $N_{ID}^{(1)}$ can be derived by cyclic shift $m_j$ to further obtain cell ID $N_{ID}^{Cell}$.

[The First Embodiment]

In order for the UE in motion to perform fast and efficient handover, the UE needs to perform not only a search for the serving cell at the present location (hereinafter referred to as "the home cell"), but also perform periodic neighbor cell search. The present invention provides a non-coherent method to search for the neighbor cell ID so that the cell IDs are decoded from the synchronization signals received by the UE, and UE can identify the home cell ID and the neighbor cell ID, which helps UE to perform fast handover for the UE in motion.

The first embodiment illustrates how the sector IDs of home cell and the neighbor cell are detected from PSS. For convenient explanation of the embodiment, it is assumed that the UE has obtained correct symbol timing and fractional carrier frequency offset from PSS. It is also assumed that the UE, through the Fast Fourier Transform (FFT), has obtained the components at every subcarrier in PSS. Therefore, the received PPS is expressed as follows:

$$Z_k = H_{k+\epsilon_s}^s P_{k+\epsilon_s}(u_s) + \sqrt{\alpha} H_{k+\epsilon_n}^n P_{k+\epsilon_n}(u_n) + V_k \quad (4)$$

k=0, 1, 2, . . . , 62

In Eq. (4), k is a subcarrier index. A frequency domain received signal $Z_k$ contains the PSS from the home cell and the PSS from the neighbor cell. $H_{k+\epsilon_s}^s$ and $H_{k+\epsilon_n}^n$ are the home cell channel response and the neighbor cell channel response respectively. $\epsilon_s$ and $\epsilon_n$ are the integer carrier frequency offsets (ICFOs) of the home cell and the neighbor cell respectively. $P_{k+\epsilon_s}(u_s)$ and $P_{k+\epsilon_n}(u_n)$ are the PSS sequences generated according to root indexes $u_s$ and $u_n$, wherein $u_s$ is the root index corresponding to the sector ID of home cell, and $u_n$ is the root index corresponding to the neighbor cell ID. $V_k$ is an additive White Gaussian Noise (AWGN) with a Variance $\sigma^2$; $1/\alpha$ is a signal-to-interference power ratio.

Since the home cell signals and the neighbor cell signals come from different eNBs and travel through different directions, the home cell channel response $H_{k+\epsilon_s}^s$ is different from the neighbor cell channel response $H_{k+\epsilon_n}^n$, and the home cell ICFO $\epsilon_s$ may be also different from the neighbor cell ICFO $\epsilon_n$. In the present embodiment, the UE is within the service area of the home cell and close to a neighbor cell. Further, the intensity of the synchronization signal sent from the base station of home cell is stronger than that of the synchronization signal sent from the base station of neighbor cell. Therefore, when the frequency domain received signal $Z_k$ is used to detect the sector ID of home cell, the synchronization signal sent from the base station of neighbor cell can be served as one type of interference.

In the present embodiment, the home cell ID is detected by performing non-coherent detection to the frequency-domain received signal $Z_k$, which does not require decoding the home cell channel response $H_{k+\epsilon_s}^s$, and directly adopts partial correlation for frequency-domain received signal $Z_k$ to simultaneously estimate an integer frequency shift. The partial correlation is expressed in the following equation:

$$(\hat{\epsilon}_s, \hat{u}_s) = \arg\max_{\epsilon, u} (\Sigma_{g=0}^{G-1} |\Sigma_{k=Cg}^{(g+1)\cdot C-1} Z_k P_{k+\epsilon}^*(u)|^2) \quad (5)$$

G represents the number of segments; C represents the length of every segment. CG=N, and N is the number of subcarriers, which is 63. According to the above Eq. (5), a maximum correlation value corresponding to a root index $\hat{u}_s$ and an ICFO $\hat{\epsilon}_s$ is derived. The sector ID corresponding to the root index $\hat{u}_s$ is the estimated sector ID of home cell. Although in the present embodiment partial correlation is adopted to detect the home cell ID, people having ordinary skilled in the art should know that the present embodiment may also adopt a matched filter, differential correlation, or coherent detection to perform channel estimation to the received signals for detecting the sector ID of home cell.

After estimating the sector ID of home cell and its ICFO, a search for the sector ID of neighbor cell will be performed in the present embodiment. In the signals received by the UE, the intensity of the signals sent from the base station of neighbor cell is smaller than that of the signals sent from the base station of home cell. Therefore, when detecting the neighbor cell ID, the signals from the base station of home cell cannot be ignored or considered as interference. The present embodiment provides an algorithm to simplify and analyze the aforementioned frequency domain received signal $Z_k$, that is, the $k^{th}$ and $(k+1)^{th}$ frequency domain received signals $Z_k$ and $Z_{k+1}$ are multiplied by known local synchronization signals respectively. And then, the difference between the two products is calculated to generate a combination received signal $F_k$. Wherein, the known local synchronization signals is generated by the root index $\hat{u}_s$ corresponding to the detected sector ID of home cell and the detected ICFO $\hat{\epsilon}_s$ (i.e. the synchronization signals $P_{k+\hat{\epsilon}_s}(\hat{u}_s)$ and $P_{k+1+\hat{\epsilon}_s}(\hat{u}_s)$). Through the above computation, the signal from the base station of home cell can be removed and the signal from the neighbor cell base station preserves. Its aforementioned algorithm can be read as follows:

$$F_k = P_{k+1+\epsilon_s}^*(u_s)Z_{k+1} - P_{k+\epsilon_s}^*(u_s)Z_k \quad (6)$$

$$= (H_{k+1+\epsilon_s}^s - H_{k+\epsilon_s}^s) +$$

$$\sqrt{\alpha}(H_{k+1+\epsilon_n}^n P_{k+1+\epsilon_s}^*(u_s)P_{k+1+\epsilon_n}(u_n) -$$

$$H_{k+\epsilon_n}^n P_{k+\epsilon_s}^*(u_s)P_{k+\epsilon_n}(u_n)) +$$

$$(P_{k+1+\epsilon_s}^*(u_s)V_{k+1} - P_{k+\epsilon_s}^*(u_s)V_k)$$

In the above Eq. (6), it is assumed that the detected sector ID of home cell $\hat{u}_s$ and the detected ICFO $\hat{\epsilon}_s$ are correct, i.e. $\hat{u}_s = u_s$, $\hat{\epsilon}_s = \epsilon_s$.

Generally, the coherent bandwidth of wireless transmission channels is larger than the width between two adjacent subcarriers. In the present embodiment, in order to simplify Eq. (6), it is assumed the channel difference between adjacent $k^{th}$ and $(k+1)^{th}$ subcarriers is relatively small and can be ignored, i.e. $H_{k+1+\epsilon_s}^s \approx H_{k+\epsilon_s}^s$, and $H_{k+1+\epsilon_n}^n \approx H_{k+\epsilon_n}^n$. Therefore, Eq. (6) can then be approximated as follows:

$$F_k = P^*_{k+1+\epsilon_s}(u_s)Z_{k+1} - P^*_{k+\epsilon_s}(u_s)Z_k \qquad (7)$$
$$\approx \sqrt{\alpha}\, H^n_{k+\epsilon_n}(P^*_{k+1+\epsilon_s}(u_s)P_{k+1+\epsilon_n}(u_n) -$$
$$P^*_{k+\epsilon_s}(u_s)P_{k+\epsilon_n}(u_n)) +$$
$$(P^*_{k+1+\epsilon_s}(u_s)V_{k+1} - P^*_{k+\epsilon_s}(u_s)V_k)$$
$$k = 0, 1, 2, \ldots, 62.$$

It is known from Eq. (6) and (7) that the signal of home cell $H_{k+\epsilon_s}^s P_{k+\epsilon_s}(u_s)$ in $Z_k$ is multiplied by $P^*_{k+\epsilon_s}(u_s)$ only to obtain $H_{k+\epsilon_s}^s$. By the same logic, the signal of home cell $H_{k+1+\epsilon_s}^s P_{k+1+\epsilon_s}(u_s)$ after multiplication by $P^*_{k+1+\epsilon_s}(u_s)$ can also be simplified as $H_{k+1+\epsilon_s}^s$. Moreover, the applicants assume that channel responses of two adjacent subcarriers are similar channel responses, meaning $H_{k+1+\epsilon_s}^s - H_{k+\epsilon_s}^s \approx 0$. Upon subtracting the two products $P^*_{k+1+\epsilon_s}(u_s)Z_{k+1}$ and $P^*_{k+\epsilon_s}(u_s)Z_k$, the signals of home cell and a majority part of channel effects in $Z_k$ and $Z_{k+1}$ are removed. In other words, in the actual combination signal $F_k$, the signal $H_{k+1+\epsilon_s}^s P_{k+1+\epsilon_s}(u_s)$ received from the home cell is almost completely removed and only the unknown synchronization signal from the neighbor cell is retained. Hence, when detecting the neighbor cell sector ID, the present embodiment no longer utilizes received signal $Z_k$ but uses combination signal $F_k$, whose signal component of home cell has been removed.

The combination signal $F_k$ in the above Eq. (7) can be simplified as follows:

$$F_k \approx \sqrt{\alpha}\, H^n_{k+\epsilon_n}(P^*_{k+1+\epsilon_s}(u_s)P_{k+1+\epsilon_n}(u_n) - \qquad (8)$$
$$P^*_{k+\epsilon_s}(u_s)P_{k+\epsilon_n}(u_n)) +$$
$$(P^*_{k+1+\epsilon_s}(u_s)V_{k+1} - P^*_{k+\epsilon_s}(u_s)V_k)$$
$$= \sqrt{\alpha}\, H^n_{k+\epsilon_n} Q_k(u_s, \epsilon_s, u_n, \epsilon_n) + U_k$$
$$k = 0, 1, 2, \ldots, 62.$$

Generally, sector ID detection through calculating the correlation is to calculate the level of similarity between the received signal and every possible PSS. When detecting the neighbor cell ID, the PSS is $P_{k+\epsilon_n}(u_n)$, $u_n = 25, 29, 34$. However, in the present embodiment, detection of the neighbor cell ID does not utilize received signal $Z_k$ but uses combination signal $F_k$ whose signal components of home cell have been removed. Therefore, concerning about correlation calculation for detection, using the original PSS $P_{k+\epsilon_n}(u_n)$ to calculate correlation will increase the error rate and the detection result may be distorted. Theoretically, when calculating the correlation, the local signal should use the original signal not interfered by any channel effect. It can be seen from the simplification of Eq. (8), since $\sqrt{\alpha}H_{k+\epsilon_n}^n$ can be considered as a coefficient related to the channel, the applicants in the present embodiment calculate the correlation between the combination signal $F_k$ and $Q_k(u_s, \epsilon_s, u_n, \epsilon_n)$ to detect the sector ID of neighbor cell. In other words, the original PSS $P_{k+\epsilon_n}(u_n)$, which is to be detected, is expressed by a new reference sequence $Q_k(u_s, \epsilon_s, u_n, \epsilon_n)$. Wherein, $u_s$ and $\epsilon_s$ in reference sequence $Q_k(u_s, \epsilon_s, u_n, \epsilon_n)$ are the root index and the ICFO of the home cell respectively. When detecting the neighbor cell ID, both $u_s$ and $\epsilon_s$ are previous known values.

In addition, the other reason that the applicants calculate the correlation between the combination signal $F_k$ and $Q_k(u_s, \epsilon_s, u_n, \epsilon_n)$ for detecting the sector ID of neighbor cell is that the embodiment of the present invention emphasizes neighbor cell search adopts non-coherent method, that is, before the neighbor cell ID search, the channel response for the neighbor cell will not be estimated in advance. Further, it is clear from the above mathematical derivation that $\sqrt{\alpha}H_{k+\epsilon_n}^n$ is extremely low relative to correlation operation, and therefore the present embodiment utilizes sequence $Q_k(u_s, \epsilon_s, u_n, \epsilon_n)$ to perform correlation operation so that the amount of computation required for channel estimation in receiver is reduced.

After some manipulation, the above new reference sequence $Q_k(u_s, \epsilon_s, u_n, \epsilon_n)$ is expressed as follows:

$$Q_k(u_s, \epsilon_s, u_n, \epsilon_n) = P^*_{k+1+\epsilon_s}(u_s)P_{k+1+\epsilon_n}(u_n) - \qquad (9)$$
$$P^*_{k+\epsilon_s}(u_s)P_{k+\epsilon_n}(u_n)$$
$$= \exp(-j\pi(u_n - u_s)(k + 1 + \epsilon_s)$$
$$(k + 1 + \epsilon_s)/63) \cdot$$
$$\exp(-j\pi u_n(\Delta^2 - 2k\Delta - 2\Delta -$$
$$2\epsilon_s \Delta)/63) \cdot (-2j) \cdot$$
$$(\sin(\pi(u_n - u_s)(k + 1 + \epsilon_s) - u_n\Delta)/63).$$

Figure 6A:
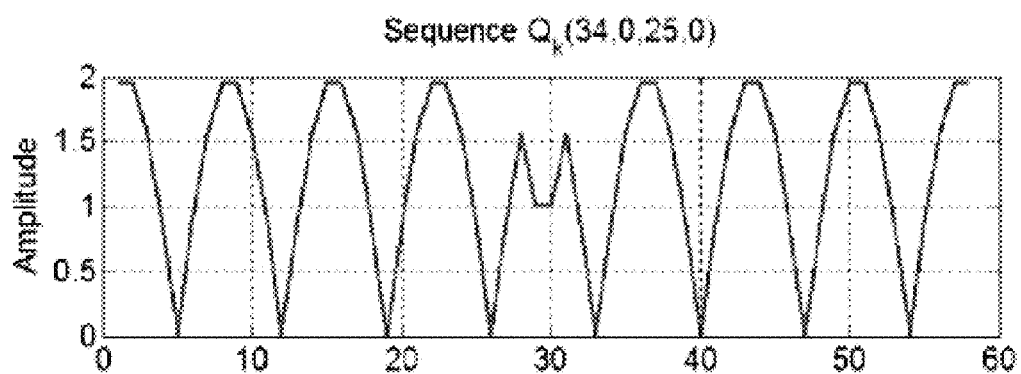
FIG. 6A is a waveform of $Q_k(34, 0, 25, 0)$ according to a preferred embodiment of the present invention.
Figure 6B:
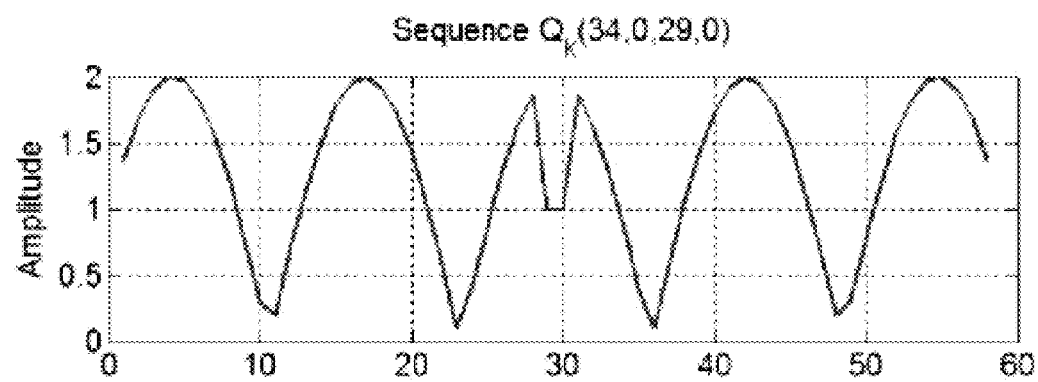
FIG. 6B is a waveform of $Q_k(34, 0, 29, 0)$ according to a preferred embodiment of the present invention.

In the above Eq. (9), $\epsilon_n = \epsilon_s - \Delta$. $Q_k(u_s, \epsilon_s, u_n, \epsilon_n)$ has sinusoidal-like amplitude as shown in FIGS. 6A and 6B. FIGS. 6A and 6B are the waveforms of $Q_k(34, 0, 25, 0)$ and $Q_k(34, 0, 29, 0)$ respectively, wherein the abscissa is the subcarrier index k, and the ordinate is amplitude. It is known from Eq. (1) that a basin around the center subcarrier (k=30) forms in FIGS. 6A and 6B since the component of the center subcarrier of PSS is zero.

Figure 7A:
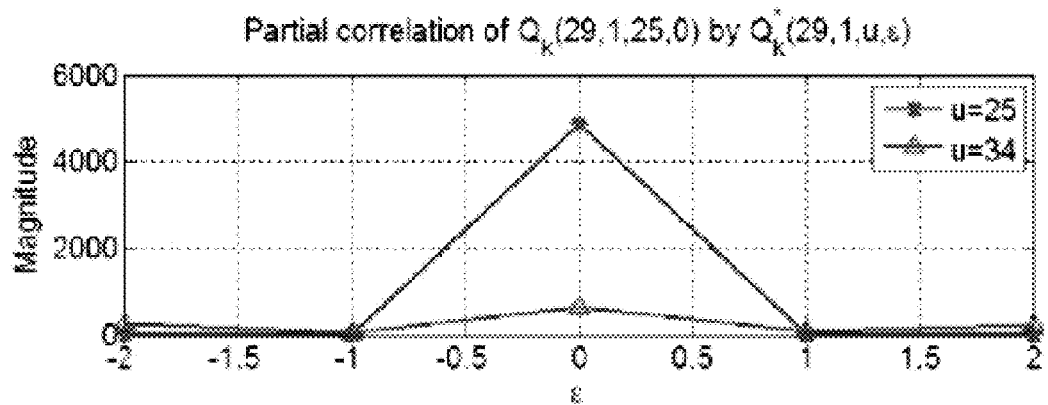
FIG. 7A schematically shows the correlation between the sequence $Q_k(29, 1, 25, 0)$ and the sequence $Q_k(29, 1, u, \epsilon)$ according to a preferred embodiment of the present invention.
Figure 7B:
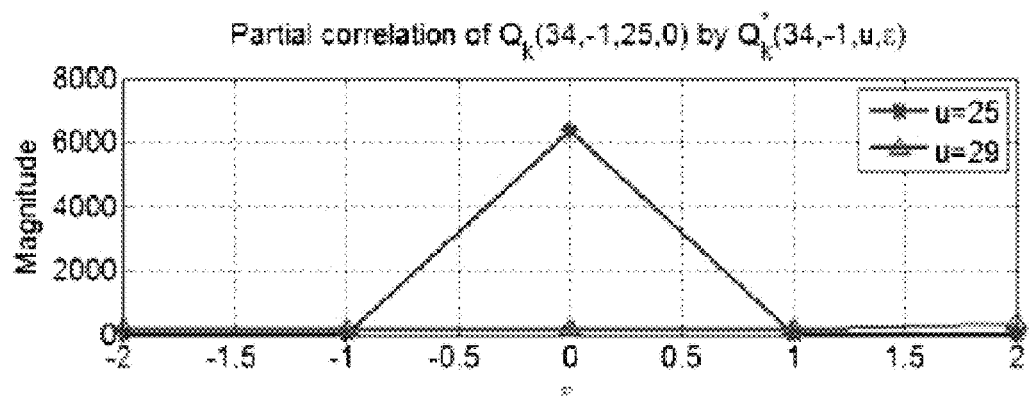
FIG. 7B schematically shows the correlation between the sequence $Q_k(34, -1, 25, 0)$ and the sequence $Q_k(34, -1, u, \epsilon)$ according to a preferred embodiment of the present invention.
Figure 7C:
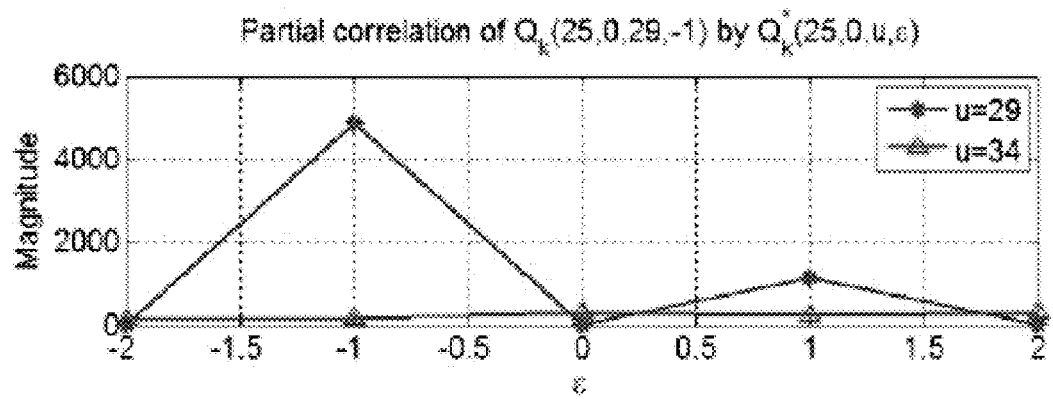
FIG. 7C schematically shows the correlation between the sequence $Q_k(25, 0, 29, -1)$ and the sequence $Q_k(25, 0, u, \epsilon)$ according to a preferred embodiment of the present invention.
Figure 7D:
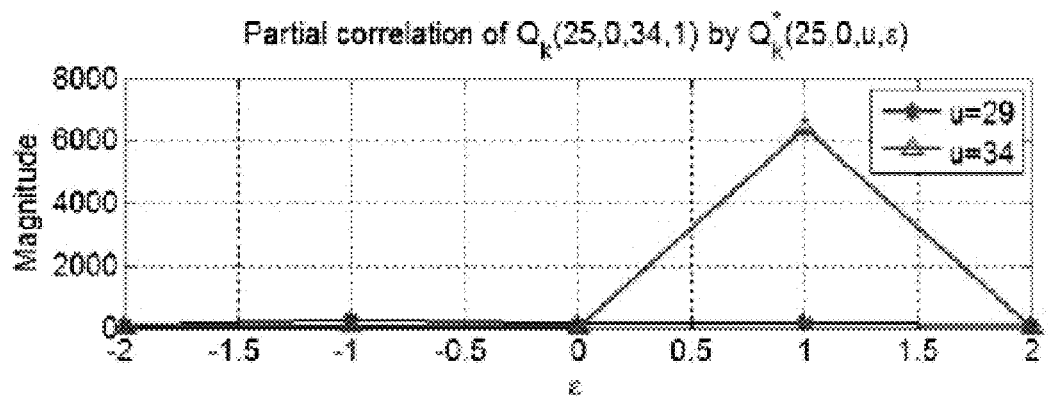
FIG. 7D schematically shows the correlation between the sequence $Q_k(25, 0, 34, 1)$ and the sequence $Q_k(25, 0, u, \epsilon)$ according to a preferred embodiment of the present invention.
Figure 8A:
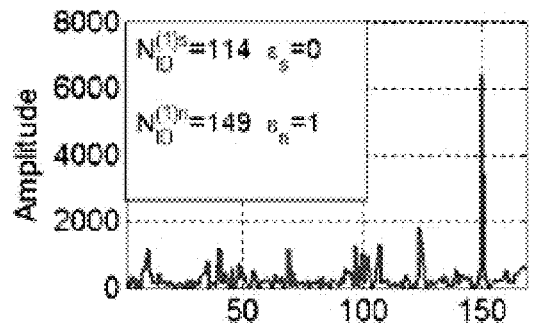
FIGS. 8A~8D schematically show the correlation in different matches between ($m_0^s$, $m_1^s$, $m_0^n$, $m_1^n$) and ($\epsilon_s, \epsilon_n$) according to a preferred embodiment of the present invention.
Figure 8B:
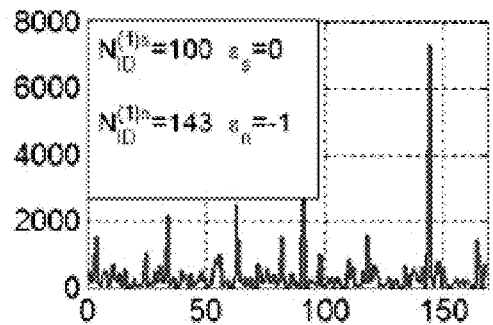
Figure 8C:
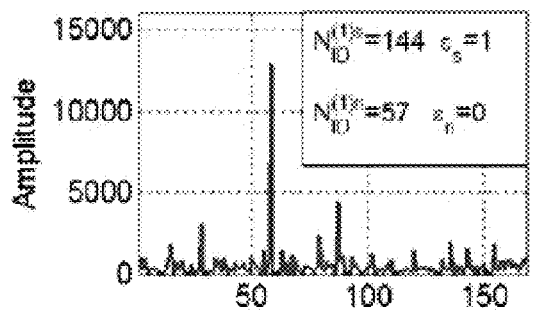
Figure 8D:
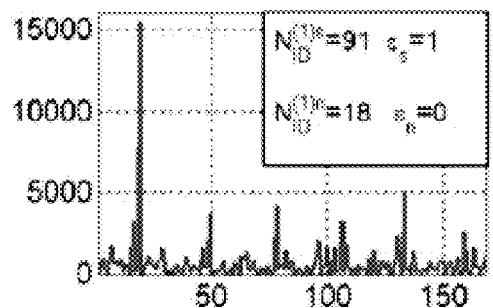
Figure 9:
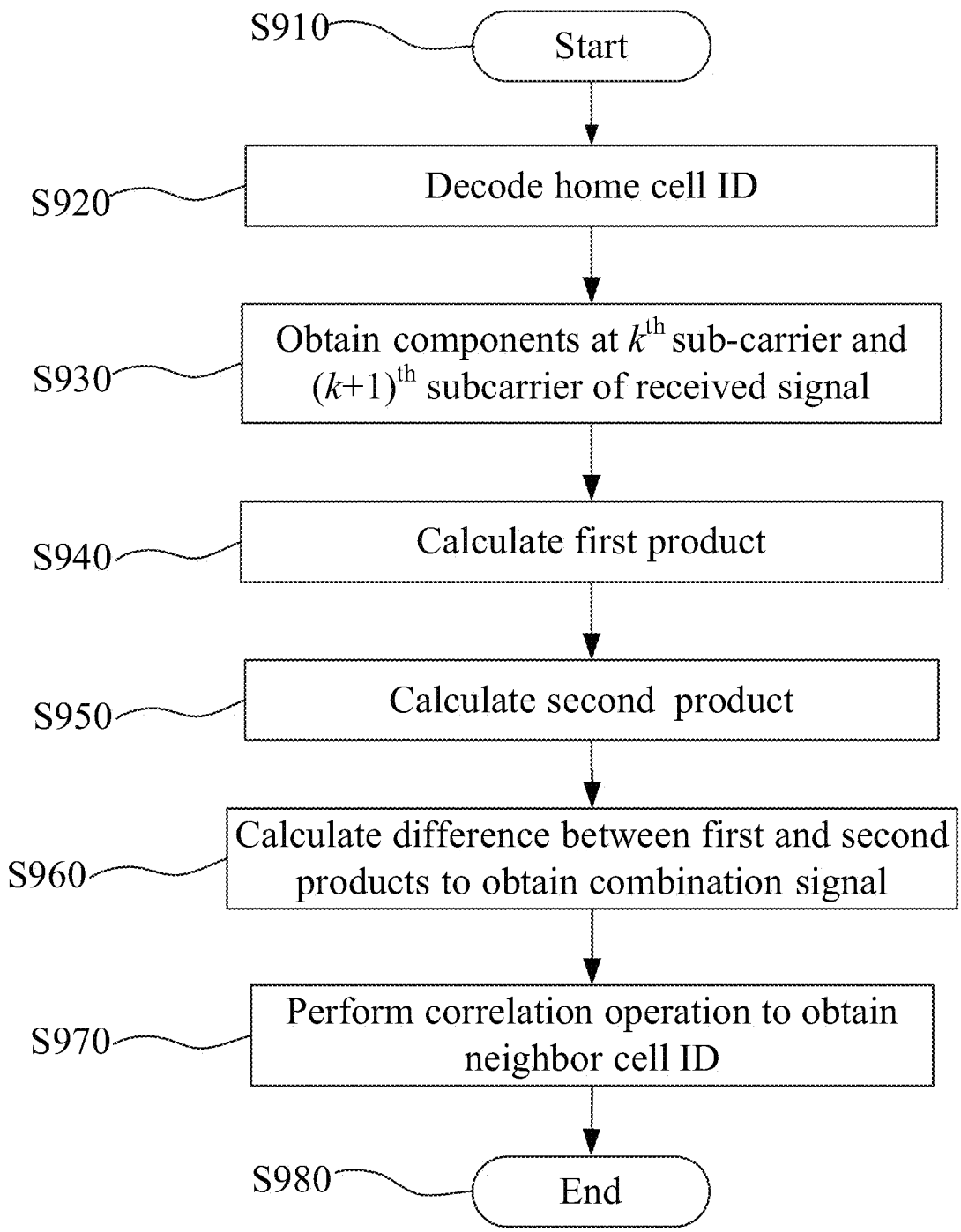
FIG. 9 is a flowchart showing a non-coherent neighbor cell search method according to a preferred embodiment of the present invention.

In order to examine the properties of sequence $Q_k(u_s, \epsilon_s, u_n, \epsilon_n)$ for detecting the sector ID of neighbor cell, the applicants use partial correlation to examine the cross-correlation properties of the sequence $Q_k(u_s, \epsilon_s, u_n, \epsilon_n)$. FIG. 7A schematically shows the correlation between sequences $Q_k(29, 1, 25, 0)$ and $Q_k(29, 1, u, \epsilon)$. FIG. 7B schematically shows the correlation between sequences $Q_k(34, -1, 25, 0)$ and $Q_k(34, -1, u, \epsilon)$. FIG. 7C schematically shows the correlation between sequences $Q_k(25, 0, 29, -1)$ and $Q_k(25, 0, u, \epsilon)$. FIG. 7D schematically shows the correlation between sequences $Q_k(25, 0, 34, 1)$ and $Q_k(25, 0, u, \epsilon)$. The abscissa is ICFO $\epsilon$; the ordinate is the correlation magnitude upon calculation. It can be seen from FIGS. 7A-7D that correlation value has a significant peak when aligned, and the cross-correlation between the sequences generated by different root indexes $u_n$ is very weak. Therefore, it is verified that sequence $Q_k(u_s, \epsilon_s, u_n, \epsilon_n)$ provided by the present embodiment still maintains its good distinguishable properties.

In order to mitigate the detection distortion caused by channel response $H_{k+\epsilon_n}^n$, the present embodiment provides a non-coherent neighbor cell sector ID search method adopting correlation operation. Through calculating correlations between combination signal $F_k$ and sequences $Q_k(u_s, \epsilon_s, u_n, \epsilon_n)$ generated by all possible $u_n$, the detected $\hat{u}_n$ corresponding to the largest correlation value is found. The correlation operation adopted in the present embodiment takes partial correlation for example, the partial correlation is expressed as follows:

$$(\hat{u}_n, \hat{\varepsilon}_n) = \underset{u,\varepsilon}{\operatorname{argmax}} \sum_{g=0}^{G-1} \left| \sum_{k=C \cdot g}^{(g+1) \cdot C - 1} F_k Q_k^*(u_s, \varepsilon_s, u, \varepsilon) \right|^2. \qquad (10)$$

Since sector IDs and root indexes have one-on-one correspondence relation, the detected Root Index $\hat{u}_n$ corresponding to the largest correlation value leads to find the correct sector ID of neighbor cell. Additionally, in Eq. (10), estimating the ICFO $\epsilon_n$ of the neighbor cell is performed simultaneously. However, considering the device accuracy of the UE and the influence from the doppler effect in practice, the present embodiment sets a fixed range for the difference $\Delta$ between the ICFOs of the home cell and the neighbor cell, such as $\Delta = \{-1, 0, 1\}$, when estimating ICFO $\epsilon_n$. Nevertheless, people having ordinary skilled in the art should know that the range of ICFO may properly adapt to the actual channel environment and the computing capability of the UE. Therefore, the present invention is not limited thereto.

In Eq. (10), G represents the number of segments; C represents the length of every segment. In a preferred embodiment of the present invention, CG=N; C and G are factors of N. N is the number of subcarriers, which is equal to 63. In the wireless channel environment, channel phases vary in the 63 subcarriers, which results in phase variation in each product value $F_k Q^*_k(u_s, \epsilon_s, u, \epsilon)$ at the 63 signal points. If ordinary simple correlation is adopted, i.e. directly adding all products, the final correlation summation will be seriously influenced by channel phase variation. Therefore, the present embodiment adopts partial correlation to perform segmental correlation operation. 63 signal points are divided into a plurality of segments. In every segments, the phases of the channel responses can be served as similar to one another so that the final correlation value upon calculation is less influenced by the phase variation.

Moreover, although the present invention sets CG=63, every signal components of the subcarriers are considered when calculating correlation. However, people having ordinary skilled in the art should know that when calculating correlation one may consider only a portion of the signal components, which leads to CG<63, such as C=10, G=6, and CG=60. To put it another way, in the present embodiment, when calculating correlation, the number of signal components may be properly adjusted. In addition, in another preferred embodiment, when the accumulated correlation value during calculation exceeds a threshold, it means the detected root index $u_n$ may very possibly be the most likely the correct root index of the combination signal $F_k$. The calculation of correlation value can stop at this component to reduce unnecessary computation.

Furthermore, the sector ID of neighbor cell is searched by partial correlation in the present embodiment. Nevertheless, people having ordinary skilled in the art should know that a matched filter or differential correlation may also be adopted to perform correlation operation. The present invention is not limited to or confined by the present embodiment described herein.

In the present embodiment, the ICFO $\hat{\epsilon}_s$ is estimated while searching for the home cell ID at the same time, and the ICFO $\hat{\epsilon}_n$ is estimated while searching for the neighbor cell ID simultaneously. However, for people having ordinary skilled in the art, it is understood that the frequency offset may also be ignored in other embodiments or the receiver has completed estimating the entire frequency offset before searching for the IDs in the present embodiment. Therefore, the present invention is not limited to or confined by estimating the frequency offset while searching for IDs in the meanwhile. In a preferred embodiment of the present invention, if the ICFO $\epsilon_s$ of the home cell and the ICFO $\epsilon_n$ of the neighbor cell are ignored, the above reference sequence $Q_k(u_s, \epsilon_s, u_n, \epsilon_n)$ can be simplified as $Q_k(u_s, u_n)$, and its value is $Q_k(u_s, u_n) = P^*_{k+1}(u_s)P_{k+1}(u_n) - P^*_k(u_s)P_k(u_n)$. The combination signal $F_k$ may be simplified as $F_k = P^*_{k+1}(u_s)Z_{k+1} - P^*_k(u_s)Z_k$. The partial correlation in the above Eq. (10) is expressed as follows:

$$\hat{u}_n = \underset{u}{\operatorname{argmax}} \sum_{g=0}^{G-1} \left| \sum_{k=C \cdot g}^{(g+1) \cdot C - 1} F_k Q_k^*(u_s, u) \right|^2.$$

[The Second Embodiment]

The present embodiment illustrates how the group IDs of the home cell and the neighbor cell are detected from SSS. $D_{i,2n}(m_0, m_1)$ and $D_{i,2n+1}(m_0, m_1)$ sent from the base station include scrambling sequences $c_0(n)$ and $c_1(n)$, and the scrambling sequences are determined by the sector ID in PSS. Therefore, it is assumed in the present embodiment that the UE has detected the sector IDs of the home cell and the neighbor cell as well as the ICFOs $\epsilon_s$ and $\epsilon_n$ thereof. The received SSS is expressed as follows:

$$Z_{i,k} = H_{i,k+\epsilon_s}{}^s D_{i,k+\epsilon_s}(m_0{}^s, m_1{}^s) + \sqrt{\alpha} H_{i,k+\epsilon_n}{}^n D_{i,k+\epsilon_n}(m_0{}^n, m_1{}^n) + V_{i,k} \qquad (11)$$

k is a subcarrier index; i is a slot index. In the received signal, the intensity of the synchronization signal sent from the base station of home cell is stronger than that of the synchronization signal sent from the base station of neighbor cell. Hence, while searching for the group ID of the home cell, the signal from base station of neighbor cell can be served as one type of interference. As a result, the received SSS is directly detected to decode the cyclic shift $(\hat{l}, \hat{m}_0{}^s, \hat{m}_1{}^s)$ corresponding to the group ID of home cell. The present embodiment takes partial correlation as an example and assumes that the UE has not yet performed frame timing synchronization. Therefore, detecting the received SSS and estimating the frame timing are performed simultaneously and expressed in the following equation:

$$(\hat{l}, \hat{m}_0^s, \hat{m}_1^s) = \underset{t,a,b}{\operatorname{argmax}} \sum_{g=0}^{G-1} \left( \left| \sum_{k=gC}^{(g+1)C-1} Z_{t,k} D_{t,k+\varepsilon_s}(a, b) \right|^2 + \left| \sum_{k=gC}^{(g+1)C-1} Z_{[i+10],k} \cdot D_{[t+10],k+\varepsilon_s}(a, b) \right|^2 \right) \qquad (12)$$

[·] represents the remainder after performing division by 20, wherein [i+10] represents the remainder after dividing (i+10) by 20, and [t+10] means the remainder after dividing (t+10) by 20. The present embodiment assumes that when performing a group ID search, the UE has not yet performed frame timing synchronization and cannot determine the received SSS belongs to which time slot. Therefore, in order to obtain the optimal frame timing and correct group ID, when the search expressed by Eq. (12) is performed, 168×2 types of possible sequences are required to be detected.

In the present embodiment, although partial correlation is adopted to detect the group ID of home cell, people having ordinary skilled in the art should know that a matched filter and differential correlation may also be adopted, or coherent detection may be used to detect the group ID of home cell after performing channel estimation.

Next, the detection of neighbor cell group ID is described in the following embodiment. In the received signal of the UE, the intensity of the signals sent from the base station of neighbor cell is smaller than that of the signals sent from the base station of home cell. Therefore, when detecting the neighbor cell ID, the signals sent from the base station of home cell cannot be ignored and cannot be considered as interference. The present embodiment adopts the method depicted in the First Embodiment: an algorithm is used to remove the signal component of the home cell in the received signal to generate a combination signal $N_{i,k}$, expressed as the following equation:

$$N_{i,k} = D_{i,k+1+\varepsilon_s}(m_0^s, m_1^s) \cdot Z_{i,k+1} - D_{i,k+\varepsilon_s}(m_0^s, m_1^s) \cdot Z_{i,k}$$

$$\approx \sqrt{\alpha} \, H_{i,k+\varepsilon_n}^n (D_{i,k+1+\varepsilon_s}(m_0^s, m_1^s) \cdot D_{i,k+1+\varepsilon_n}(m_0^n, m_1^n) -$$

$$D_{i,k+\varepsilon_s}(m_0^s, m_1^s) \cdot D_{i,k+\varepsilon_n}(m_0^n, m_1^n)) +$$

$$D_{i,k+1+\varepsilon_s}(m_0^s, m_1^s) \cdot V_{i,k+1} - D_{i,k+\varepsilon_s}(m_0^s, m_1^s) \cdot Z_{i,k}$$

$$\approx \sqrt{\alpha} \, H_{i,k+\varepsilon_n}^n R_{i,k}(m_0^s, m_1^s, m_0^n, m_1^n) + W_{i,k} \quad (13)$$

The present embodiment uses the combination signal $N_{i,k}$, whose home cell signal component has been removed instead of the received signal $Z_{i,k}$, to detect the neighbor cell ID. It is clear from the above Eq. (13) that when performing correlation operation to detect cell group ID, the local signal is no longer $D_{i,k+\varepsilon_n}(m_0^n, m_1^n)$ but a new reference sequence $R_{i,k}(m_0^s, m_1^s, m_0^n, m_1^n)$, wherein $R_{i,k}(m_0^s, m_1^s, m_0^n, m_1^n) = D_{i,k+1+\varepsilon_s}(m_0^s, m_1^s) \cdot D_{i,k+1+\varepsilon_n}(m_0^n, m_1^n) - D_{i,k+\varepsilon_s}(m_0^s, m_1^s) \cdot D_{i,k+\varepsilon_n}(m_0^n, m_1^n)$.

Likewise, we must verify if the new sequence $R_{i,k}(m_0^s, m_1^s, m_0^n, m_1^n)$ has good detecting property. The partial correlation is adopted for verification, and its expression reads as follows:

$$\Sigma_{g=0}^{G-1} |\Sigma_{k=gC}^{(g+1)C-1} R_{i,k}(m_0^s, m_1^s, m_0^n, m_1^n) \cdot R_{i,k}(m_0^s, m_1^s, a, b)|^2$$

According to the above algorithm, for every different combination of $(m_0^s, m_1^s, m_0^n, m_1^n)$ and $(\varepsilon_s, \varepsilon_n)$, we need to verify the correlation values of its corresponding sequence $R_{i,k}(m_0^s, m_1^s, m_0^n, m_1^n)$ and the 168 different types of sequences $R_{i,k}(m_0^s, m_1^s, a, b)$ generated by all a, b values. FIGS. 8A~8D are schematic drawings respectively showing the correlation in the different combinations of $(m_0^s, m_1^s, m_0^n, m_1^n)$ and $(\varepsilon_s, \varepsilon_n)$. The abscissa is the 168 types of sequences generated by all a, b values; the ordinate is the correlation values. Since the data of $R_{i,k}(m_0^s, m_1^s, m_0^n, m_1^n)$ verified by applicants is overly large, only 4 verification results are provided at random for illustration herein. According to the verification results shown in FIGS. 8A~8D, only when a, b values correspond to the correct group IDs $N_{ID}^{(1)n}$, the correlation value will appear a significant peak value, while the correlation values calculated with other a, b values are relatively low. Therefore, sequence $R_{i,k}(m_0^s, m_1^s, m_0^n, m_1^n)$ provided by the present embodiment has good detecting property.

After obtaining the combination signal $N_{i,k}$ whose signal component from home cell is removed, the present embodiment performs correlation operation to the combination signal $N_{i,k}$ so as to detect the group ID of neighbor cell. A metric $\Lambda(a, b)$ for the correlation operation is expressed as follows:

$$\Lambda(a, b) = \Sigma_{g=0}^{G-1}(|\Sigma_{k=gC}^{(g+1)C-1} N_{i,k} R_{i,k}(m_0^s, m_1^s, a, b)|^2 + |\Sigma_{k=gC}^{(g+1)C-1} N_{[i+10],k} R_{[i+10],k}(m_0^s, m_1^s, a, b)|^2) \quad (14)$$

Next, during the search, all possible a, b values are used to calculate their corresponding correlation values and detect the cyclic shift $(\hat{m}_0^n, \hat{m}_1^n)$ corresponding to the largest correlation value, its equation is expressed as follows:

$$(\hat{m}_0^n, \hat{m}_1^n) = \underset{a,b}{\mathrm{argmax}}\, \Lambda(a, b). \quad (15)$$

Since the frame timing has been estimated in the home cell search for its group ID as aforementioned, when searching for the group ID of neighbor cell, only the 168 types of sequences generated by all the possible a, b values need to be verified. The cyclic shifts and group IDs correspond to each other one by one, and therefore detecting the cyclic shift $(\hat{m}_0^n, \hat{m}_1^n)$ corresponding to the maximum correlation value means searching for the group ID of neighbor cell.

In the above Eq. (14), G represents the number of segments; C represents the length of every segment. CG=N, and N is the number of subcarriers, which is equal to 63.

Although the present embodiment sets CG=63 and every signal components of the subcarriers need to be considered when calculating correlation, having ordinary skilled in the art should know that when calculating correlation one may only consider a portion of signal components of the subcarriers, which leads to CG<63, e.g., C=10, G=6, and CG=60. To put it another way, when calculating correlation in the present embodiment, the number of calculated signal components may be properly adjusted. Moreover, in another preferred embodiment, when the accumulated correlation value exceeds a threshold during calculation, it means that the detected cyclic shift a, b may very possibly be the most likely $(\hat{m}_0^n, \hat{m}_1^n)$ of the combination signal $N_{i,k}$. The calculation of correlation values can be stopped to reduce unnecessary computation.

In addition, the group ID of neighbor cell is searched by correlation operation in the present embodiment, and correlation operation takes partial correlation for example. However, people having ordinary skilled in the art should know that the correlation operation adopted in the present embodiment may be replaced by a matched filter or differential correlation, and the correlation values of the two time slots are not required to be combined. The correlation metrics of the group ID of neighbor cell in only one time slot may also be verified individually, therefore, the present invention is not limited thereto.

It is understood from the above First and Second Embodiments that the non-coherent neighbor cell search method provided in the present invention is suitable for the search for sector ID and the group ID of the neighbor cell. In the two embodiments, the sector ID and group ID of neighbor cell are both obtained through calculating a combination signal and performing correlation operation. Nevertheless, people having ordinary skilled in the art should know that it is also feasible only one of the sector ID and group ID of neighbor cell adopts the non-coherent search method provided in the present invention, while the other ID adopts a coherent search method or a non-coherent search method in the conventional art. The present invention is not limited to or confined by the embodiments described herein.

The First and Second Embodiments can be summed up as one non-coherent neighbor cell search method. The method is at least suitable for searching for the sector ID of PSS and the group ID of SSS. The non-coherent neighbor cell search method includes the following steps.

S910: Start searching for an ID

S920: Decode the home cell ID. In the First Embodiment, the partial correlation is performed to the received signal $Z_k$ to directly detect the root index $\hat{u}_s$ corresponding to the sector ID of home cell. In addition, in the Second Embodiment, the partial correlation is performed to the received signal $Z_{i,k}$ to directly detect the cyclic shift $(\hat{m}_0^s, \hat{m}_1^s)$ corresponding to the group ID of home cell.

S930: Obtain the components at a $k^{th}$ subcarrier and a $(k+1)^{th}$ subcarrier of the received signal. In the First Embodiment, the component at the $k^{th}$ subcarrier is $Z_k$; the component at the $(k+1)^{th}$ subcarrier is $Z_{k+1}$. In the Second Embodiment, the component at the $k^{th}$ subcarrier is $Z_{i,k}$; the component at the $(k+1)^{th}$ subcarrier is $Z_{i,k+1}$.

S940: Multiply the component at the $(k+1)^{th}$ subcarrier of the received signal by a conjugation of the component at $(k+1)^{th}$ subcarrier of a local synchronization signal to obtain a first product, wherein the local synchronization signal is a synchronization signal corresponding to the detected home cell ID. In the First Embodiment, the local synchronization signal is $P_{k+1+\epsilon_s}(u_s)$; the first product is $P^*_{k+1+\epsilon_s}(u_s)Z_{k+1}$. In the Second Embodiment, the local synchronization signal is $D_{i,k+1+\epsilon_s}(m_0^s, m_1^s)$; the first product is $D_{i,k+1+\epsilon_s}(m_0^s, m_1^s) \cdot Z_{i,k+1}$.

S950: Multiply the component at the $k^{th}$ subcarrier of the received signal by the conjugation of the component at the $k^{th}$ subcarrier of the local synchronization signal to obtain a second product. In the First Embodiment, the local synchronization signal is $P_{k+\epsilon_s}(u_s)$; the Second Product is $P^*_{k+\epsilon_s}(u_s)Z_k$. In the Second Embodiment, the local synchronization signal is $D_{i,k+\epsilon_s}(m_0^s, m_1^s)$; the Second Product is $D_{i,k+\epsilon_s}(m_0^s, m_1^s)Z_{i,k}$.

S960: Calculate a difference between the first product and the second product to obtain a combination signal. In the First Embodiment, the expression of the combination signal is $F_k = P^*_{k+1+\epsilon_s}(u_s)Z_{k+1} - P^*_{k+\epsilon_s}(u_s)Z_k$. In the Second Embodiment, combination signal is $N_{i,k}$; the expression of the combination signal is $N_{i,k} = D_{i,k+1+\epsilon_s}(m_0^s, m_1^s)Z_{i,k+1} - D_{i,k+\epsilon_s}(m_0^s, m_1^s)Z_{i,k}$. From the above embodiments, propose of calculating difference of two products is for removing the signal component of home cell. Therefore, although the first product is subtracted with the second product to obtain the combination signal in the above embodiments, people having ordinary skilled in the art should know that the difference obtained from subtracting the first product from the second product also reaches the same propose. Hence, the present invention is not limited to or confined by the combination signal obtained by subtracting the second product from the first product.

S970: Perform correlation operation between all possible sequences associated with all possible IDs of the neighbor cell and the combination signal so as to obtain the neighbor cell ID. In the embodiment of the present invention, a reference sequence function $Y(x)$ is provided as the reference function for performing correlation operation. The reference sequence function Y corresponds to all the possible IDs of the neighbor cell, wherein x is possible ID of the neighbor cell.

In the First Embodiment, the component at the $k^{th}$ subcarrier of reference sequence function $Y(x)$ is $Q_k(u_s, \epsilon_s, u, \epsilon)$, for example. In the correlation operation of Step S970, all the possible root indexes u and frequency offsets $\epsilon$ of the neighbor cell are substituted into the new sequence $Q_k(u_s, \epsilon_s, u, \epsilon)$ respectively to calculate correlation values according to Eq. (10) and decode the root index $\hat{u}_n$ associated with the maximum correlation value so as to find the sector ID of neighbor cell. In the Second Embodiment, the component of the $k^{th}$ subcarrier in the reference sequence function $Y(x)$ is $R_{i,k}(m_0^s, m_1^s, a, b)$, for example. In the correlation operation of Step S970, all the possible cyclic shifts a, b are substituted into the new sequence $R_{i,k}(m_0^s, m_1^s, a, b)$ respectively to calculate correlation values according to Eq. (14) and decode cyclic shift $(\hat{m}_0^n, \hat{m}_1^n)$ associated with the maximum correlation value so as to find the group ID of neighbor cell.

S980: Stop the search.

In the First and Second Embodiments, the non-coherent neighbor cell search method is used so that the UE avoids performing channel estimation of the neighbor cell and the amount of operation the UE performing during decoding is reduced. However, the search method provided in the present invention is also suitable for the UE performing channel estimation of the neighbor cell. For example, if the UE estimates the channel response of the neighbor cell, the channel response may be used to remove the channel response in the received combination signal, and then the search method of the present invention is performed. Alternatively, the estimated channel response is used to generate a new sequence $(Q'_k(u_s, \epsilon_s, u_n, \epsilon_n)$ or $R'_{i,k}(m_0^s, m_1^s, m_0^n, m_1^n))$, and the new sequence is then used to perform correlation operation. The expression of sequence $Q'_k(u_s, \epsilon_s, u_n, \epsilon_n)$ is $H_{k+\epsilon_n}{}^n Q_k(u_s, \epsilon_s, u_n, \epsilon_n)$, for example; the expression of sequence $R'_{i,k}(m_0^s, m_1^s, m_0^n, m_1^n)$ is $H_{i,k+\epsilon_n}{}^n R_{i,k}(m_0^s, m_1^s, m_0^n, m_1^n)$, for example. In other words, the neighbor cell search method provided in the present invention is both suitable for coherent and non-coherent neighbor cell search.

To sum up, the embodiments of the present invention have at least the following advantages:

1. The applicants perform a mathematical analysis to the received signal to provide a combination signal and remove the signal component and the channel response of the home cell in the received signal to leave the unknown signal from the neighbor cell. Further, the combination signal is used to perform the neighbor cell ID search so that the accuracy of the neighbor cell search is enhanced.

2. In a preferred embodiment of the present invention, when the neighbor cell search is performed to detect its sector ID, a new sequence $Q_k(u_s, \epsilon_s, u, \epsilon)$ is provided as the reference sequence for performing correlation operation. The provided sequence $Q_k(u_s, \epsilon_s, u, \epsilon)$ has a significant autocorrelation peak value and a very low cross-correlation value and therefore has excellent detecting property. As a result, the error rate of detection is reduced and the distortion caused by the channel response is mitigated. Likewise, in another preferred embodiment of the present invention, when the neighbor cell search is performed to detect group ID, a new sequences $R_{i,k}(m_0^s, m_1^s, a, b)$ is provided and also verified as having excellent detecting property.

3. In a preferred embodiment of the present invention, the partial correlation is adopted to perform the neighbor cell ID search so that the channel response is mitigated and the calculated correlation values are less influenced by the phase variation of channel.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art. It will be apparent that various changes and modifications can be made without departing from the spirit and scope of the invention as defined in the appended claims.

What is claimed is:

1. A non-coherent neighbor cell search method, adapted for a user equipment (UE), wherein the UE communicates through a home cell, the non-coherent neighbor cell search method comprising:

decoding a home cell identification (ID) by the UE;

obtaining components at a $k^{th}$ subcarrier and a $(k+1)^{th}$ subcarrier of a received signal by the UE;

multiplying the component at the $(k+1)^{th}$ subcarrier of the received signal by a conjugation of a component at a $(k+1)^{th}$ subcarrier of a local synchronization signal by the UE, for removing the local synchronization signal from the component at the $(k+1)^{th}$ subcarrier of the received signal, to obtain a first product, wherein the local synchronization signal is a synchronization signal that corresponds with the home cell ID;

multiplying the component at the $k^{th}$ subcarrier of the received signal by the conjugation of a component at a $k^{th}$ subcarrier of the local synchronization signal by the UE, for removing the local synchronization signal from the component at the $k^{th}$ subcarrier of the received signal, to obtain a second product;

calculating a difference between the first product and the second product by the UE, for removing a home cell channel response signal, to obtain a combination signal; and performing a correlation operation between the combination signal and all possible sequences associated with all possible IDs of neighbor cells by the UE so as to obtain a neighbor cell ID;

wherein the UE can successfully switch and connect a specific neighbor cell from the home cell by the neighbor cell ID obtain from the correlation operation when the UE is close to the specific neighbor cell; and wherein k is an integer.

2. The non-coherent neighbor cell search method according to claim 1, wherein the step of performing the correlation operation between the combination signal and all possible sequences associated with all possible IDs of the neighbor cell so as to obtain the neighbor cell ID comprises:

providing a reference sequence function Y according to an operation of the combination signal;

substituting M possible IDs in the reference sequence function Y, wherein an $X^{th}$ ID is substituted in the reference sequence function Y to obtain Y(x);

performing the correlation operation to obtain M correlation values, wherein the correlation operation between Y(x) corresponding to the $X^{th}$ possible ID and the combination signal is performed to obtain an $X^{th}$ correlation value;

searching a maximum correlation value among the correlation values; and detecting an ID that corresponds with the maximum correlation value to serve as the neighbor cell ID, wherein X and M are both positive integers.

3. The non-coherent neighbor cell search method according to claim 2, wherein the received signal is a primary synchronization signal in a primary synchronization channel, the home cell ID is a sector ID of the home cell, and the neighbor cell ID is a sector ID of the neighbor cell.

4. The non-coherent neighbor cell search method according to claim 3, wherein a component at a $k^{th}$ subcarrier of the reference sequence function Y is represented as $Q_k(u_s, u)$, wherein $$Q_k(u_s, u) = P^*_{k+1}(u_s)P_{k+1}(u) - P^*_k(u_s)P_k(u);$$

wherein $u_s$ represents a decoded root index corresponding to the sector ID of the home cell, u represents a root index corresponding to the possible sector ID of the neighbor cell, $P_k(u_s)$ represents a component at a $k^{th}$ subcarrier of the primary synchronization signal corresponding to the root index $u_s$, $P_k(u)$ represents a component at a $k^{th}$ subcarrier of the primary synchronization signal corresponding to the root index u, $P_{k+1}(u_s)$ represents a component of a $(k+1)^{th}$ subcarrier of the primary synchronization signal corresponding to the root index $u_s$, $P_{k+1}(u)$ represents a component of a $(k+1)^{th}$ subcarrier of the primary synchronization signal corresponding to the root index u.

5. The non-coherent neighbor cell search method according to claim 4, wherein the received signal is represented as $Z_k$, the number of subcarriers in the received synchronization channel is represented as N, the component at the $k^{th}$ subcarrier of the local synchronization signal is represented as $P_k(u_s)$, the combination signal is represented as $F_k$, wherein $F_k$ is represented as:

$$F_k = P^*_{k+1}(u_s)Z_{k+1} - P^*_k(u_s)Z_k,$$

wherein the correlation operation is partial correlation and represented as:

$$\Sigma_{g=0}^{G-1} |\Sigma_{k=C \cdot g}^{(g+1) \cdot C-1} F_k Q^*_k(u_s, u)|^2,$$

wherein G represents a partial number, C represents a partial length, wherein CG is smaller than or equal to N;

wherein G, C and N are positive integers.

6. The non-coherent neighbor cell search method according to claim 4, wherein N=63; C and G are divisors of 63, and CG=N.

7. The non-coherent neighbor cell search method according to claim 3, wherein decoding the home cell ID comprises:

decoding a sector ID of the home cell; and detecting a frequency offset in the primary synchronization signal of the home cell.

8. The non-coherent neighbor cell search method according to claim 7, wherein a decoded root index corresponding to the sector ID of the home cell is represented as $u_s$, a detected integral carrier frequency offset of the primary synchronization signal for the home cell is represented as $\epsilon_s$, and a component at a $k^{th}$ subcarrier of the reference sequence function Y is represented as $Q_k(u_s, \epsilon_s, u, \epsilon)$, wherein $$Q_k(u_s, \epsilon_s, u, \epsilon) = P^*_{k+1+\epsilon_s}(u_s)P_{k+1+\epsilon}(u) - P^*_{k+\epsilon_s}(u_s)P_{k+\epsilon}(u),$$

u represents a root index corresponding to a possible sector ID of the neighbor cell, $\epsilon$ represents a possible integral carrier frequency offset in the primary synchronization signal of the neighbor cell, $P_{k+\epsilon_s}(u_s)$ represents a component at a $k^{th}$ subcarrier of the primary synchronization signal corresponding to the root index $u_s$ under integral carrier frequency offset $\epsilon_s$, $P_{k+\epsilon}(u)$ represents a component at a $k^{th}$ subcarrier of the primary synchronization signal corresponding to the root index u under integral carrier frequency offset $\epsilon$, $P_{k+1+\epsilon_s}(u_s)$ represents a component at a $(k+1)^{th}$ subcarrier of the primary synchronization signal corresponding to the root index $u_s$ under integral carrier frequency offset $\epsilon_s$, $P_{k+1+\epsilon}(u)$ represents a component at a $(k+1)^{th}$ subcarrier of the primary synchronization signal corresponding to the root index u under integral carrier frequency offset $\epsilon$.

9. The non-coherent neighbor cell search method according to claim 8, wherein the received signal is represented as $Z_k$, the number of subcarriers in the received synchronization channel is represented as N, the component at the $k^{th}$ subcarrier of the local synchronization signal is represented as $P_{k+\epsilon_s}(u_s)$, the combination signal is represented as $F_k$, wherein $$F_k = P^*_{k+1+\epsilon_s}(u_s)Z_{k+1} - P^*_{k+\epsilon_s}(u_s)Z_k,$$

wherein the correlation operation is partial correlation and the expression thereof is:

$$\Sigma_{g=0}^{G-1}|\Sigma_{k=Cg}^{(g+1)C-1}F_k Q^*_k(u_s, \epsilon_s, u, \epsilon)|^2,$$

wherein G represents a partial number, C represents a partial length, CG represents smaller than or equal to N; wherein G, C and N are positive integers.

10. The non-coherent neighbor cell search method according to claim 9, wherein N=63; C and G are divisors of 63, and CG=N.

11. The non-coherent neighbor cell search method according to claim 2, wherein the received signal is a secondary synchronization signal in a secondary synchronization channel, the home cell ID is a group ID of the home cell, and the neighbor cell ID is a group ID of the neighbor cell.

12. The non-coherent neighbor cell search method according to claim 11, wherein a component at a $k^{th}$ subcarrier of the reference sequence function Y is represented as $R_{i,k}(m_0^s, m_1^s, a, b)$, wherein $$R_{i,k}(m_0^s, m_1^s, a, b) = D_{i,k+1+\epsilon_s}(m_0^s, m_1^s) \cdot D_{i,k+1+\epsilon_n}(a, b) - D_{i,k+\epsilon_s}(m_0^s, m_1^s) \cdot D_{i,k+\epsilon_n}(a, b),$$

wherein $(m_0^s, m_1^s)$ represents a decoded cyclic shift corresponding to the group ID of the home cell, (a, b) represents a cyclic shift corresponding to the possible group ID of the neighbor cell, i represents a time slot index, $\epsilon_s$ represents an integral carrier frequency offset of the home cell, $\epsilon_n$ represents an integral carrier frequency offset of the neighbor cell, $D_{i,k+\epsilon_s}(m_0^s, m_1^s)$ represents a component at a $k^{th}$ subcarrier of the secondary synchronization signal corresponding to the cyclic shift $(m_0^s, m_1^s)$ under integral carrier frequency offset $\epsilon_s$, and $D_{i,k+\epsilon_n}(a, b)$ represents a component at a $k^{th}$ subcarrier of the secondary synchronization signal corresponding to the cyclic shift (a, b) under integral carrier frequency offset $\epsilon_n$.

13. The non-coherent neighbor cell search method according to claim 12, wherein the received signal is represented as $Z_{i,k}$, the number of subcarriers in the received synchronization channel is represented as N, a component at a $k^{th}$ subcarrier of the local synchronization signal is represented as $D_{i,k+\epsilon_s}(m_0^s, m_1^s)$ under integral carrier frequency offset $\epsilon_s$, the combination signal is represented as $N_{i,k}$, wherein $$N_{i,k} = D_{i,k+1+\epsilon_s}(m_0^s, m_1^s) \cdot Z_{i,k+1} - D_{i,k+\epsilon_s}(m_0^s, m_1^s) \cdot Z_{i,k},$$

wherein the correlation operation is partial correlation, and the expression thereof is:

$$(\hat{m}_0^n, \hat{m}_1^n) = \underset{a,b}{\mathrm{argmax}} \left\{ \sum_{g=0}^{G-1} \left( \left| \sum_{k=gC}^{(g+1)C-1} N_{i,k} R_{i,k}(m_0^s, m_1^s, a, b) \right|^2 + \left| \sum_{k=gC}^{(g+1)C-1} N_{[i+10],k} \cdot R_{[i+10],k}(m_0^s, m_1^s, a, b) \right|^2 \right) \right\},$$

wherein G represents a partial number, C represents a partial length, CG represents smaller than or equal to N; wherein G, C and N are positive integers.

14. The non-coherent neighbor cell search method according to claim 13, wherein N=63; C and G are divisors of 63, and CG=N.

15. The non-coherent neighbor cell search method according to claim 1, the correlation operation is partial correlation, differential correlation or a matched filter.

16. The non-coherent neighbor cell search method according to claim 1, wherein decoding the home cell ID comprises:
estimating a channel; and
detecting the home cell ID according to the result of the channel estimation.

17. The non-coherent neighbor cell search method according to claim 1, wherein decoding the home cell ID comprises:
performing correlation operation between the received signal and all possible IDs of the home cell to obtain the home cell ID.

18. A neighbor cell search method, adapted for a user equipment (UE), also suitable for a coherent search or a non-coherent search, wherein the UE communicates through a home cell, and the neighbor cell search method comprises:
decoding a home cell idenfication (ID) by said UE;
obtaining a component at a $k^{th}$ subcarrier and a component at a $(k+1)^{th}$ subcarrier of a received signal by the UE;
multiplying the component at the $(k+1)^{th}$ subcarrier of the received signal by a conjugation of a component at a $(k+1)^{th}$ subcarrier of a local synchronization signal by the UE, for removing the local synchronization signal from the component at the $(k+1)^{th}$ subcarrier of the received signal, to obtain a first product, wherein the local synchronization signal is the synchronization signal corresponding to the home cell ID;
multiplying the component at the $k^{th}$ subcarrier of the received signal by the conjugation of a component at a $k^{th}$ subcarrier in the local synchronization signal by the UE, for removing the local synchronization signal from the component at the $k^{th}$ subcarrier of the received signal, to obtain a second product;
calculating a difference between the first product and the second product by the UE, for removing a home cell channel response signal, to obtain a combination signal;
providing a reference sequence function, by the UE, corresponding to the combination signal according to a calculation of the combination signal, wherein the reference sequence function is a function of all possible IDs of neighbor cells;
performing correlation operation between the combination signal and the reference sequence function by the UE, wherein all possible IDs of neighbor cells are respectively substituted into the reference sequence function and then correlation operation between the combination signal and the substituted reference sequence function respectively is performed; and selecting a candidate neighbor cell ID, by the UE, corresponding to a maximum correlation value to serve as the neighbor cell ID according to correlation operation;
wherein the UE can successfully switch and connect a specific neighbor cell from the home cell by the neighbor cell ID obtain from the correlation operation when the UE is close to the specific neighbor cell; and
wherein k is an integer.

19. The non-coherent neighbor cell search method according to claim 1, wherein the received signal includes the local synchronization signal, the home cell channel response signal, and a neighbor cell signal.

20. A non-coherent neighbor cell search method, adapted for a user equipment (UE), wherein the UE communicates through a home cell, the non-coherent neighbor cell search method comprising:

decoding a home cell identification (ID) by the UE;

obtaining components at a $k^{th}$ subcarrier and a $(k+1)^{th}$ subcarrier of a received signal by the UE, wherein the received signal includes a signal which is broadcast from a base station of the home cell and a signal which is broadcast from a base station of a neighbor cell;

multiplying the component at the $(k+1)^{th}$ subcarrier of the received signal by a conjugation of a component at a $(k+1)^{th}$ subcarrier of a local synchronization signal by the UE, for removing the local synchronization signal from the component at the $(k+1)^{th}$ subcarrier of the received signal, to obtain a first product, wherein the local synchronization signal is a synchronization signal that corresponds with the home cell ID, and the first product includes a home cell channel response and a $(k+1)^{th}$ residual component;

multiplying the component at the $k^{th}$ subcarrier of the received signal by the conjugation of a component at a $k^{th}$ subcarrier of the local synchronization signal by the UE, for removing the local synchronization signal from the component at the $k^{th}$ subcarrier of the received signal, to obtain a second product, wherein the second product includes the home cell channel response and a $k^{th}$ residual component;

calculating a difference between the first product and the second product by the UE, for removing a home cell channel response signal, to obtain a combination signal, which the home cell channel response is substantially eliminated, such that a component of the signal from the base station of the home cell is reduced; and performing a correlation operation between the combination signal and all possible sequences associated with all possible IDs of neighbor cells by the UE so as to obtain a neighbor cell ID;

wherein a component in the $k^{th}$ residual component and a component in the $(k+1)^{th}$ residual component corresponding to a station of a specific neighbor cell becomes greater when the UE is close to the station of the specific neighbor cell;

wherein the UE can successfully switch and connect to a specific neighbor cell from the base station of a home cell by the neighbor cell ID obtained from the correlation operation when the UE is close to the specific neighbor cell; and wherein k is an integer.

* * * * *